(12) United States Patent
Sidorovich Paradiso (10) Patent No.: US 12,330,089 B2
(45) Date of Patent: Jun. 17, 2025

(54) DYNAMIC DEAERATION SYSTEM

(71) Applicant: PRATT & WHITNEY CANADA CORP., Longueuil (CA)

(72) Inventor: Ivan Sidorovich Paradiso, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 474 days.

(21) Appl. No.: 17/930,772

(22) Filed: Sep. 9, 2022

(65) Prior Publication Data

US 2024/0082755 A1   Mar. 14, 2024

(51) Int. Cl.

| | | |
|---|---|---|
| *B01D 19/00* | (2006.01) | |
| *B01D 45/12* | (2006.01) | |
| *F02C 7/06* | (2006.01) | |
| *F16N 39/00* | (2006.01) | |
| *B01D 45/14* | (2006.01) | |

(52) U.S. Cl.
CPC ..... *B01D 19/0052* (2013.01); *B01D 19/0057* (2013.01); *B01D 45/12* (2013.01); *F02C 7/06* (2013.01); *B01D 45/14* (2013.01); *F05D 2220/323* (2013.01); *F05D 2260/98* (2013.01)

(58) Field of Classification Search
None
See application file for complete search history.

(56) References Cited

U.S. PATENT DOCUMENTS

| | | | |
|---|---|---|---|
| 2,034,914 A | 3/1936 | Lanser | |
| 2,725,956 A | 12/1955 | Cunningham | |
| 8,231,714 B2 | 7/2012 | Cornet et al. | |
| 9,714,561 B2 | 7/2017 | Hopper | |
| 9,976,490 B2 | 5/2018 | Sheridan | |
| 10,729,992 B2 | 8/2020 | Pulter et al. | |

(Continued)

FOREIGN PATENT DOCUMENTS

| | | |
|---|---|---|
| DE | 749024 C | 9/1952 |
| DE | 19704845 A1 | 8/1998 |

(Continued)

OTHER PUBLICATIONS

European Search Report issued in counterpart application 23196666.4 on Jan. 30, 2024.

*Primary Examiner* — Gabriel E Gitman
(74) *Attorney, Agent, or Firm* — NORTON ROSE FULBRIGHT CANADA LLP (57) ABSTRACT

A deaeration rotor for an aircraft engine lubrication system comprising: an internal ring about an axis having a radially outer internal ring surface defining an inner boundary of an inner passage of the deaeration rotor; an external ring about the axis having a radially inner external ring surface defining an outer boundary of an outer passage of the deaeration rotor; a disc about the axis radially between the internal ring and the external ring, the disc having a radially inner disc surface defining an outer boundary of the inner passage and a radially outer disc surface defining an inner boundary of the outer passage; and blades circumferentially spaced from one another relative to the axis extending in the outer passage from at least one of the external ring and the disc, the blades located radially inward of an annular portion of the outer passage immediately downstream of the blades.

20 Claims, 6 Drawing Sheets

(56) References Cited

U.S. PATENT DOCUMENTS

| | | |
|---|---|---|
| 11,253,804 B2 | 2/2022 | Scaife |
| 2006/0064954 A1 | 3/2006 | Yokota et al. |
| 2021/0356077 A1 | 11/2021 | Daniel et al. |
| 2022/0026021 A1* | 1/2022 | Martin .................... F01D 25/18 |

FOREIGN PATENT DOCUMENTS

| | | |
|---|---|---|
| DE | 102011014750 | 9/2012 |
| EP | 0654292 | 5/1995 |
| EP | 1353038 | 10/2003 |
| EP | 3315182 | 5/2018 |
| GB | 561521 | 5/1944 |
| SU | 638382 | 12/1978 |
| WO | 20040076022 A1 | 9/2004 |
| WO | 2005028067 | 3/2005 |
| WO | 2014150836 | 9/2014 |

* cited by examiner

FIG-5

DYNAMIC DEAERATION SYSTEM

TECHNICAL FIELD

The application relates generally to aircraft engine lubrication systems and, more particularly, to deaerators thereof.

BACKGROUND

Aircraft engines have rotating parts supported by bearings. A lubricant, typically oil, is circulated to bearing cavities to ensure proper bearing functionality and durability, and scavenged from the bearing cavities for eventual recirculation to the bearing cavities. When the oil returns to the pump(s) for recirculation, it can be in the form of an air-oil foamy mixture having significant air content. In a static reservoir, the mixture would eventually separate over time, the lower density of the air driving it upwardly in reaction to the denser oil's pull downward due to the action of gravity. However, aircraft engines are very dynamic environments, where weight is a constant design concern, in addition to manufacturability, durability, and costs generally, such that it may not be practical to base a deaerating strategy solely on usage of a static reservoir. For instance, it may be desirable to limit the amount of oil carried by the aircraft. Such considerations can favor the use of a deaerator to actively separate the air from the oil using centrifugal acceleration. While existing deaerators have fulfilled their purpose to some degree, there always remains room for improvement, including in optimizing deaerator(s) so as to maximize separation efficiency while minimizing maintenance needs, weight, and cost, among possibilities.

SUMMARY

In accordance with an aspect of the present technology, there is provided a deaeration rotor for an aircraft engine lubrication system, the deaeration rotor comprising: an internal ring extending about an axis, the internal ring having a radially outer internal ring surface defining an inner boundary of an inner passage of the deaeration rotor; an external ring extending about the axis, the external ring having a radially inner external ring surface defining an outer boundary of an outer passage of the deaeration rotor; a disc extending about the axis radially between the internal ring and the external ring, the disc having a radially inner disc surface defining an outer boundary of the inner passage and a radially outer disc surface defining an inner boundary of the outer passage; and a series of blades circumferentially spaced from one another relative to the axis, the series of blades extending in the outer passage from at least one of the external ring and the disc, the series of blades located radially inward of an annular portion of the outer passage immediately downstream of the series of blades.

In accordance with another aspect of the present technology, there is provided a deaeration system for an engine lubrication system, the deaeration system comprising: a deaeration rotor rotatable about an axis and defining a rotor inlet extending circumferentially around the axis, the deaeration rotor including: an internal ring extending about the axis; a disc extending about the axis, the disc and the internal ring defining radially therebetween an inner passage of the deaeration rotor downstream of the rotor inlet; an external ring extending about the axis, the external ring surrounding the internal ring and the disc, the external ring and the disc defining radially therebetween an outer passage of the deaeration rotor downstream of the rotor inlet; a series of blades circumferentially spaced from one another relative to the axis, the series of blades extending in the outer passage from at least one of the external ring and the disc, the series of blades located radially inward of an annular portion of the outer passage immediately downstream of the series of blades; and a supply conduit having a supply outlet upstream of the rotor inlet and radially inward of the annular portion of the outer passage.

BRIEF DESCRIPTION OF THE DRAWINGS

Reference is now made to the accompanying figures in which.

DETAILED DESCRIPTION

Figure 1:
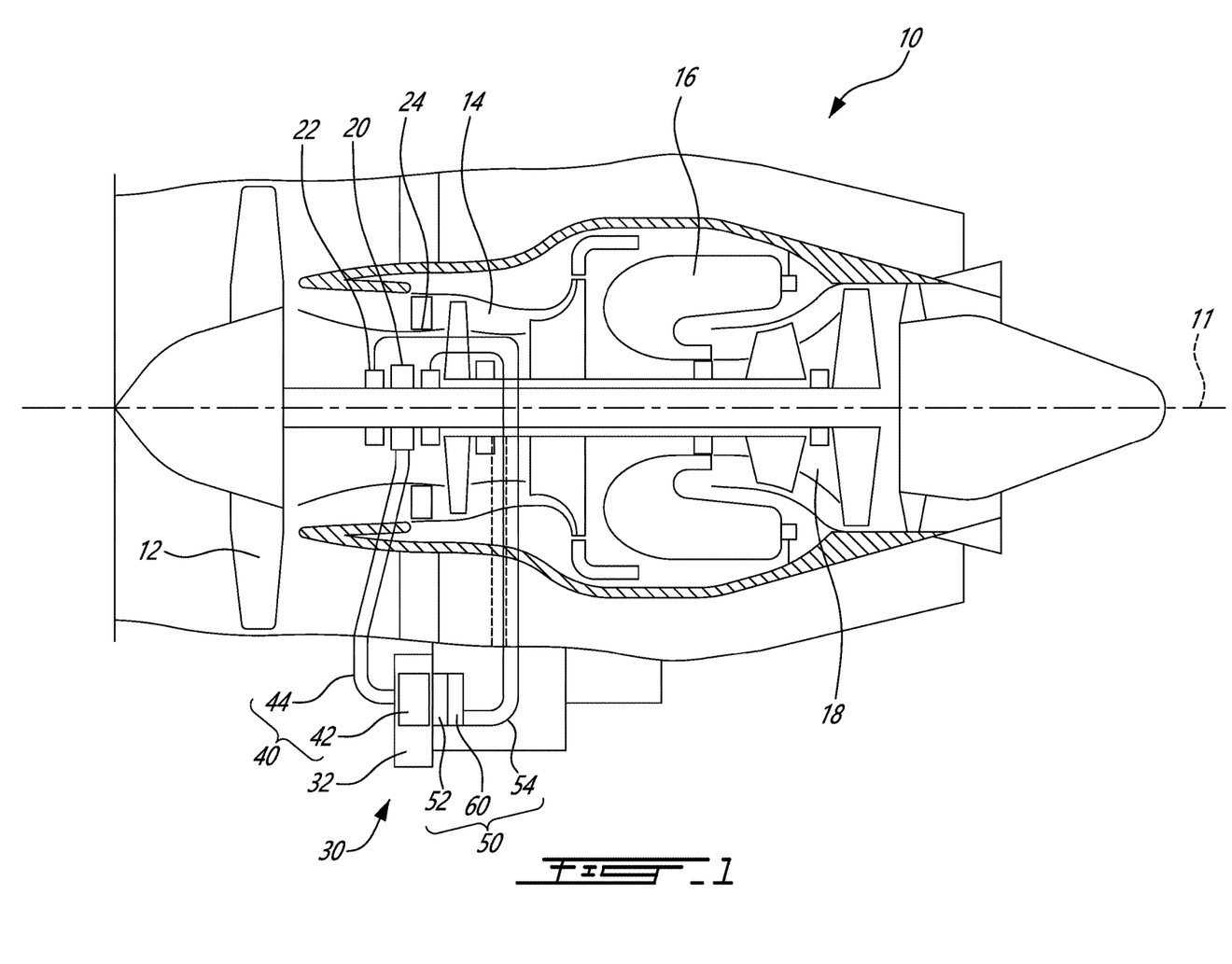
FIG. 1 is a schematic cross-sectional view of a turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. Seals 22 are used to delimit bearing cavities 24 and a fluid lubricant, such as oil, is used to promote performance and lifespan of the bearings 20. A lubrication system 30 of the engine 10 provides suitable lubrication to the bearings 20. The lubrication system 30 includes a reservoir 32 from which oil may be circulated to and from the bearings 20. The lubrication system 30 also includes an oil supply system 40 which includes one or more supply pump(s) 42, sometimes referred to as a main pump, and a supply line 44 defined by cavities, conduits and/or nozzles in fluid communication with the pump 42 and provided to feed the bearings 20 with oil. The supply pump 42 typically draws the oil from the oil reservoir 32 of the lubrication system 30. The lubrication system 30 also includes an oil scavenge system 50, which includes one or more scavenge pump(s) 52, and a return line 54 defined by cavities, conduits and/or nozzles in fluid communication with the pump 52 and provided to recover oil from the bearing cavities 24. At that stage, recovered oil can be in the form of an air-oil mixture, or foam. A dynamic air-oil separation device, henceforth referred to as a dynamic deaeration system or deaerator 60, can be used in the oil scavenge system 50 to achieve a suitable degree of separation of the air from the oil relatively quickly while advantageously limiting the footprint/volume of the reservoir 32 compared to that otherwise needed if it were to be used as the sole deaeration means, i.e., if it were used while relying solely on the effect of gravity on the mixture in the reservoir 32 to achieve the suitable degree of air-oil separation. Due to the fluids present in the air-oil mixture having different densities, at least a portion of the deaerator 60 can be configured such that rotation thereof harnesses centrifugal acceleration to accelerate the separation of the oil from the air relative to the rate at which separation tends to arise naturally over time. Separation efficiency, a specification which typically refers to the degree at which the fluids are effectively separated from one another in various operating conditions, and which can specify limits of percentage of oil in air, or percentage of air in oil, whether by volume and/or by weight, for instance, is typically a significant consideration in aircraft lubrication system deaerator design. In FIG. 1, the lubrication system 30 is shown as having a sole scavenge pump 52 disposed downstream of the deaerator 60 between the deaerator 60 and the reservoir 32. It is contemplated that depending on the embodiment, a scavenge pump 52 could be disposed upstream of the deaerator 60 and/or the scavenge pump 52 downstream of the deaerator 60 could be omitted.

Figure 2A:
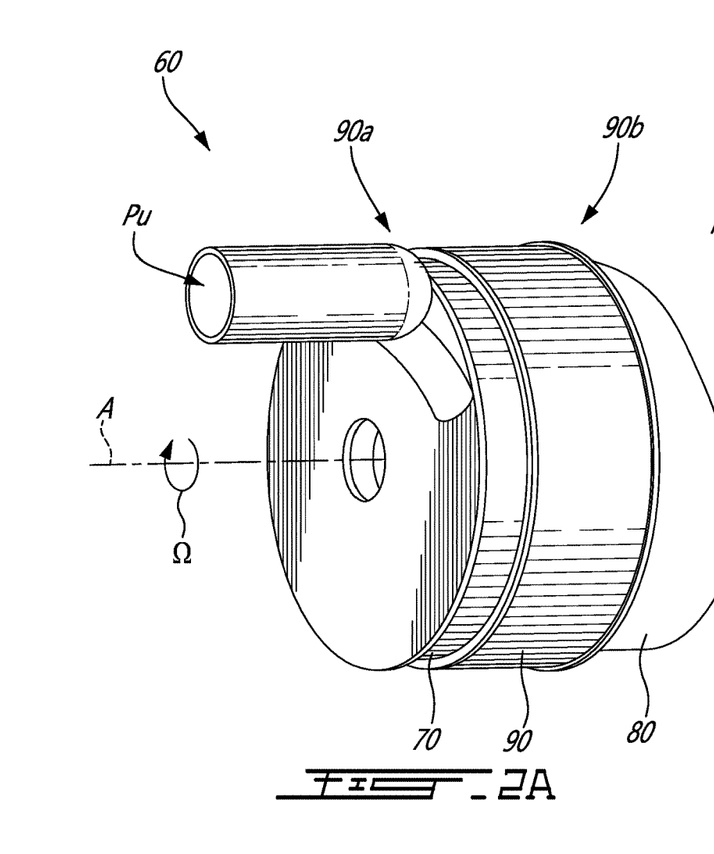
FIGS. 2A and 2B are perspective views of a deaeration system of the turbine engine of FIG. 1 according to embodiments.
Figure 2B:
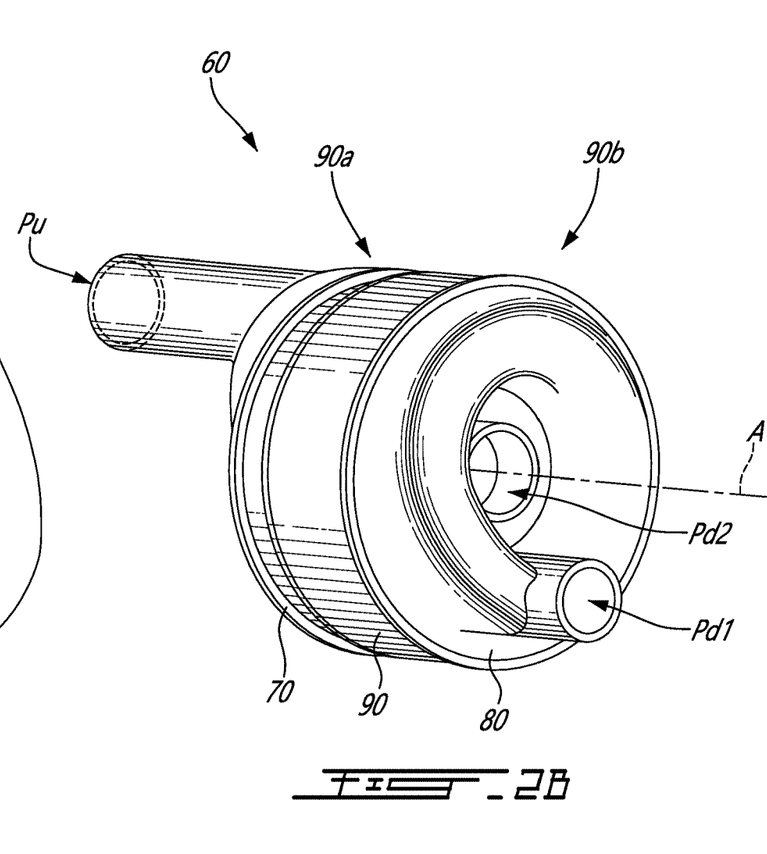

An example of a deaerator 60 according to the present technology will now be generally described with reference to FIGS. 2A-2B. The deaerator 60 generally includes an upstream component 70 (or supply conduit), a downstream component 80 (or dispensing conduits) and a deaeration rotor 90 (hereinafter "rotor 90") rotatable about an axis A relative to the upstream and downstream components 70, 80, in this case held stationary. The upstream and downstream components 70, 80 are respectively disposed on opposite upstream 90a and downstream 90b sides of the rotor 90. The upstream component 70 defines an upstream passage $P_u$ (FIG. 2A), or mixture upstream passage, fluidly connected to the bearing cavity 24 upstream thereof. The downstream component 80 defines a first downstream passage $P_{d1}$, or downstream oil passage, fluidly connected to the reservoir 32, and a second downstream passage $P_{d2}$ (FIG. 2B), or downstream air passage. The second downstream passage $P_{d2}$ may be fluidly connected to a breather conduit of the engine 10 via which the separated air may be discharge overboard. A reduced oil tank of the engine 10 may be fluidly connected between the second downstream passage $P_{d2}$ and the breather conduit. This tank may have outlets, one of which being fluidly connected to the return line 54, and another one being fluidly connected to the breather conduit. The rotor 90 is structured and arranged relative to the upstream component 70 and the downstream component 80 for separating a flow F of air-oil mixture coming from the upstream passage $P_u$ into a first flow (or oil flow) and a second flow (or air flow), and to route the first and second flows respectively to the first downstream passage Pal and the second downstream passage $P_{d2}$. As will be described in further detail hereinbelow, the rotor 90 defines a first (or outer) rotor passage $P_{r1}$ and a second (or inner) rotor passage $P_{r2}$ (FIG. 5) in fluid communication between the upstream passage $P_u$ and respectively the first downstream passage Pal and the second downstream passage $P_{d2}$. Some separation of the air-oil mixture may occur as the flow F progresses into the rotor 90. When the rotor 90 rotates about the axis A as the flow F progresses therein, separation efficiency of the deaerator 60 may be enhanced. Depending on the embodiment, the rotor 90 may be flow driven, i.e., brought into rotation about the axis A by way of the flow F impinging thereon, and/or externally driven, i.e., brought into rotation via a suitable power source external to the rotor 90.

Figure 3A:
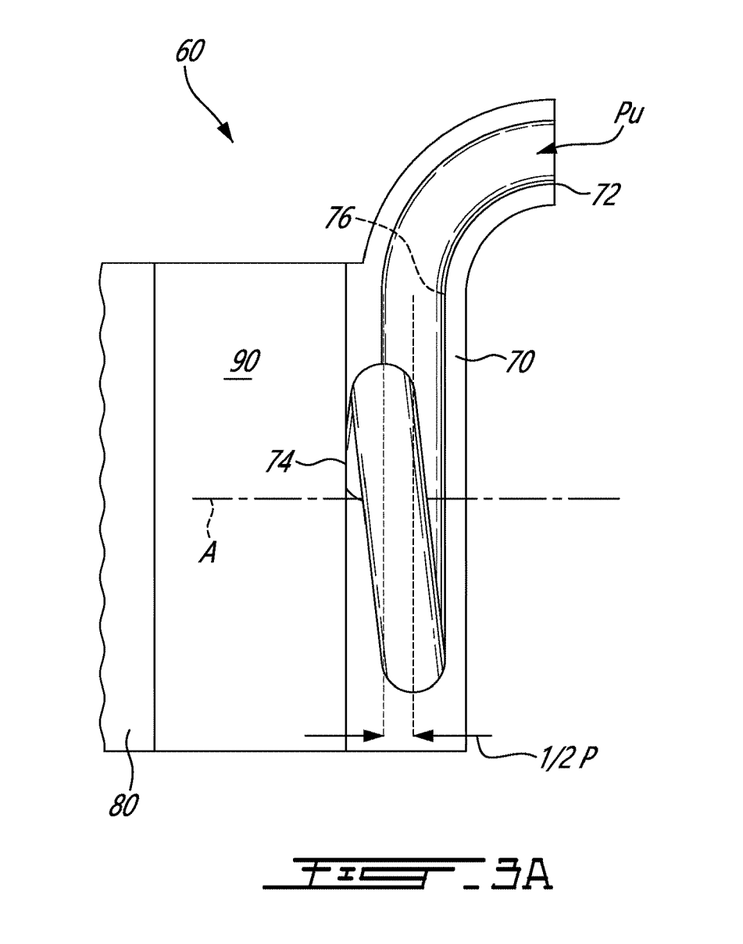
FIG. 3A is a lateral elevation view of the deaeration system of FIGS. 2A and 2B.
Figure 3B:
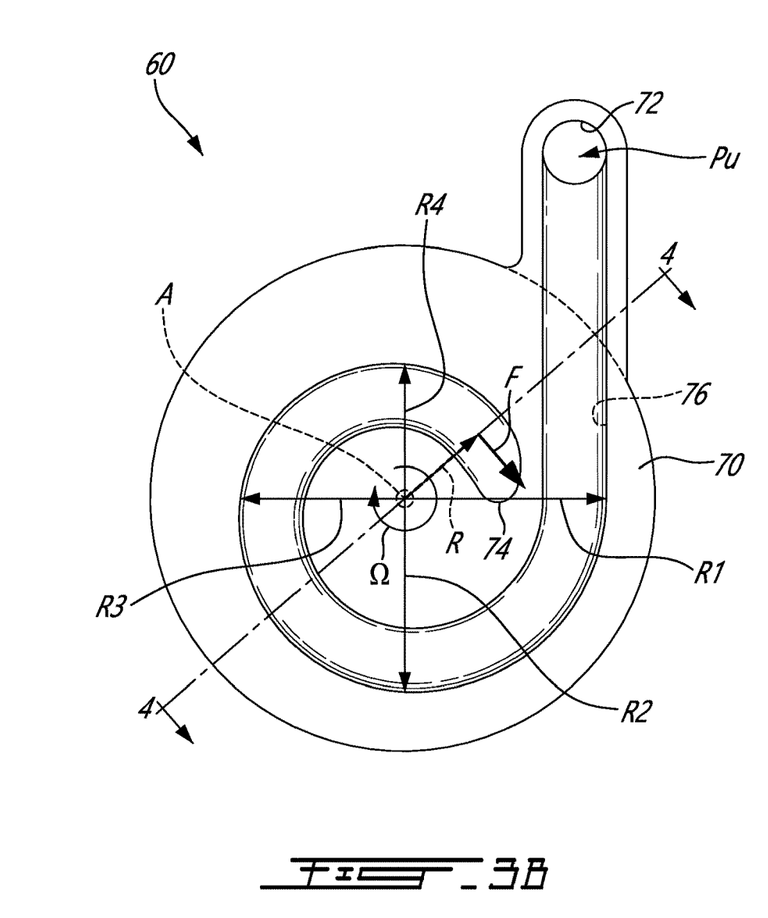
FIG. 3B is a rear side view of the deaeration system of FIGS. 2A and 2B.

Referring to FIGS. 3A and 3B, possible characteristics of the upstream component 70 will now be described. The upstream component 70 generally has a peripheral wall defining an inlet 72 (or supply inlet), an outlet 74 (or supply outlet), and a cavity 76, in this case tubular in shape, that extends lengthwise from the inlet 72 to the outlet 74. The inlet 72, the outlet 74 and the cavity 76 together define the upstream passage $P_u$. The upstream component 70 can have different cross-sectional profiles, depending on the embodiment, and the cross-sectional profile(s) can vary lengthwise or otherwise be constant.

In embodiments, the outlet 74 of the upstream component 70 may route the flow F such that it enters the rotor 90 at a location and/or in an incident direction that is favorable to separation efficiency. For this purpose, the outlet 74 may be located at a radial distance R relative to the axis A. The outlet 74 may face in a direction having a circumferential component relative to the axis A, i.e., a component perpendicular to a radial direction relative to the axis A. By such arrangement, the flow F exiting the upstream component 70 may impinge on the rotor 90 so as to impart a rotational force thereon. Stated otherwise, a circumferential component of a force exerted by the flow F onto the rotor 90 at the radial distance D may contribute to induce rotation of the rotor 90 about the axis A in a given rotation direction $\Omega$.

In embodiments, the upstream component 70 may condition the flow F such that some separation of the air-oil mixture occurs therein upstream of the rotor 90. The upstream conduit 70 may for example have a swirling shape, i.e., may turn as it extends away from the inlet 72 and toward the outlet 74, preferably in a handedness similar to that of the rotation direction $\Omega$. In a process akin to centrifugation, the swirling shape of the upstream component 70 causes the flow F to turn as it transits therein, imparting the air-oil mixture with radial acceleration relative to one or more axes (for example the axis A) as it turns. During this process, denser component(s) of the air-oil mixture, e.g., oil, migrate away from the axis (i.e., toward the outside of the turn), and less dense component(s) of the air-oil mixture, e.g., air, migrate toward the axis (i.e., toward the inside of the turn). The swirling shape may be cylindrical, i.e., may define an arcuate segment of a given radius, for example relative to the axis A. The swirling shape may be helical, i.e., may progress axially by a pitch P (a half measure of the pitch P, or "½ P", is schematically shown in FIG. 3A) toward the rotor 90 as it turns so as to lead the flow F into the rotor 90. Such a helical shape may also constrict radially as it progresses axially, for example defining progressively smaller radii, such as schematically shown in FIG. 3B by radii R1, R2, R3, R4. The swirling shape may advantageously be defined adjacent to the outlet 74, i.e., proximate to the rotor 90, which may assist in preserving separation of the flow F until it enters the rotor 90. FIGS. 3A and 3B merely show one of the numerous contemplated arrangements for the upstream component 70. Other exemplary implementations of the upstream component 70 are disclosed in U.S. patent application Ser. No. 17/155,895, the contents of which are incorporated herein by reference.

Figure 4:
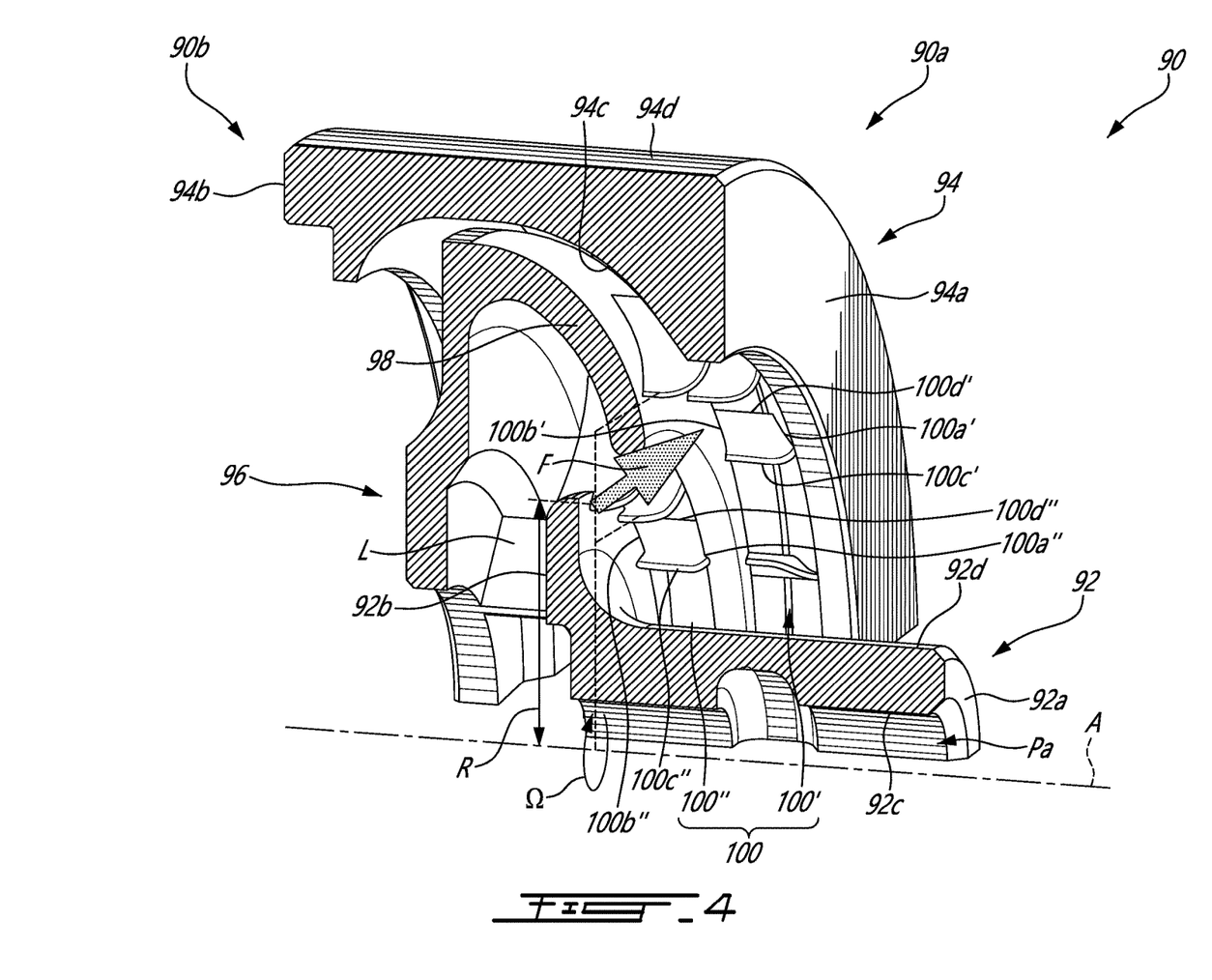
FIG. 4 is a cut-away, perspective view of a deaeration rotor of the deaeration system of FIGS. 2A and 2B.
Figure 5:
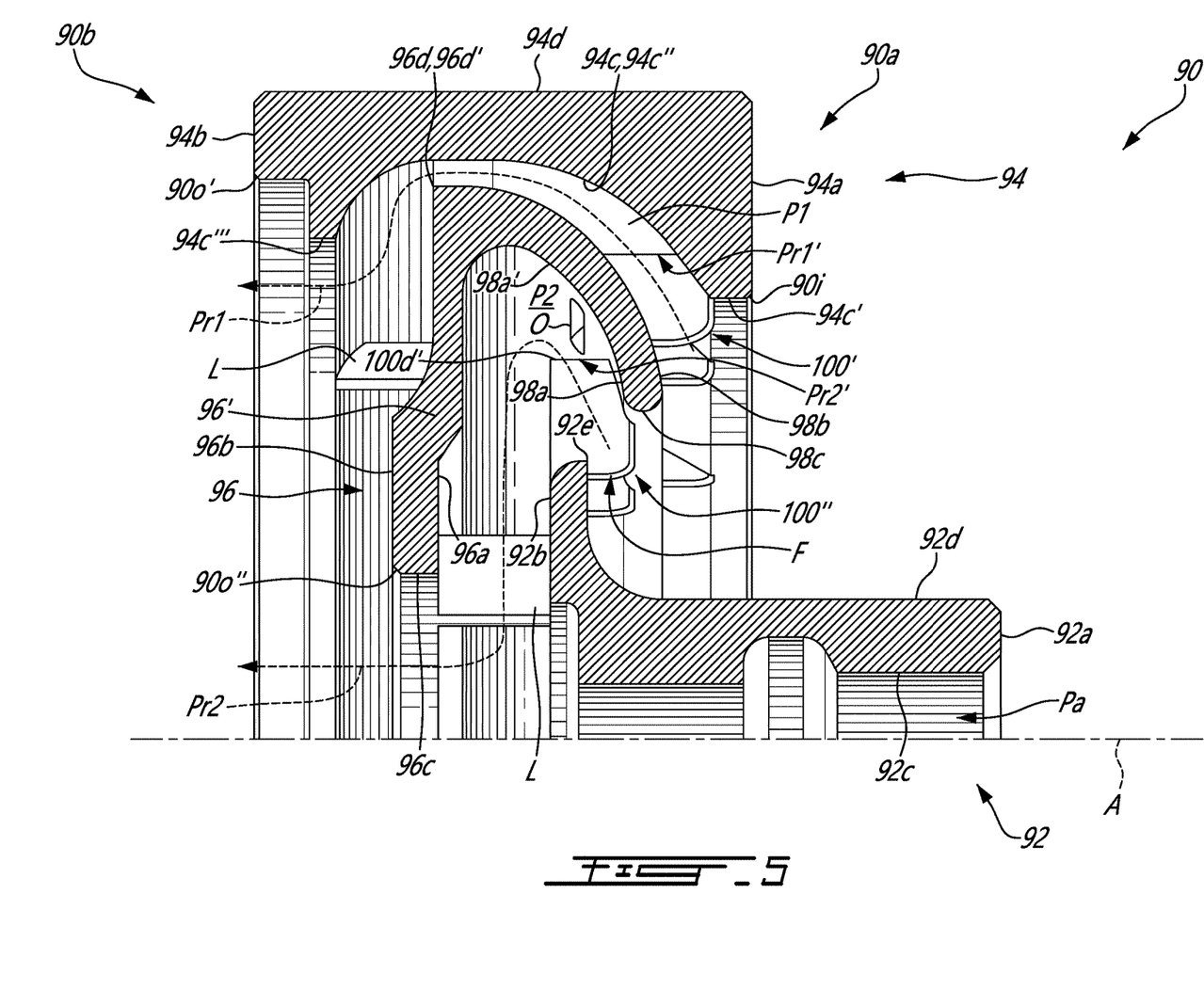
FIG. 5 is a cross-sectional view of the deaeration rotor of FIG. 4.
Figure 6:
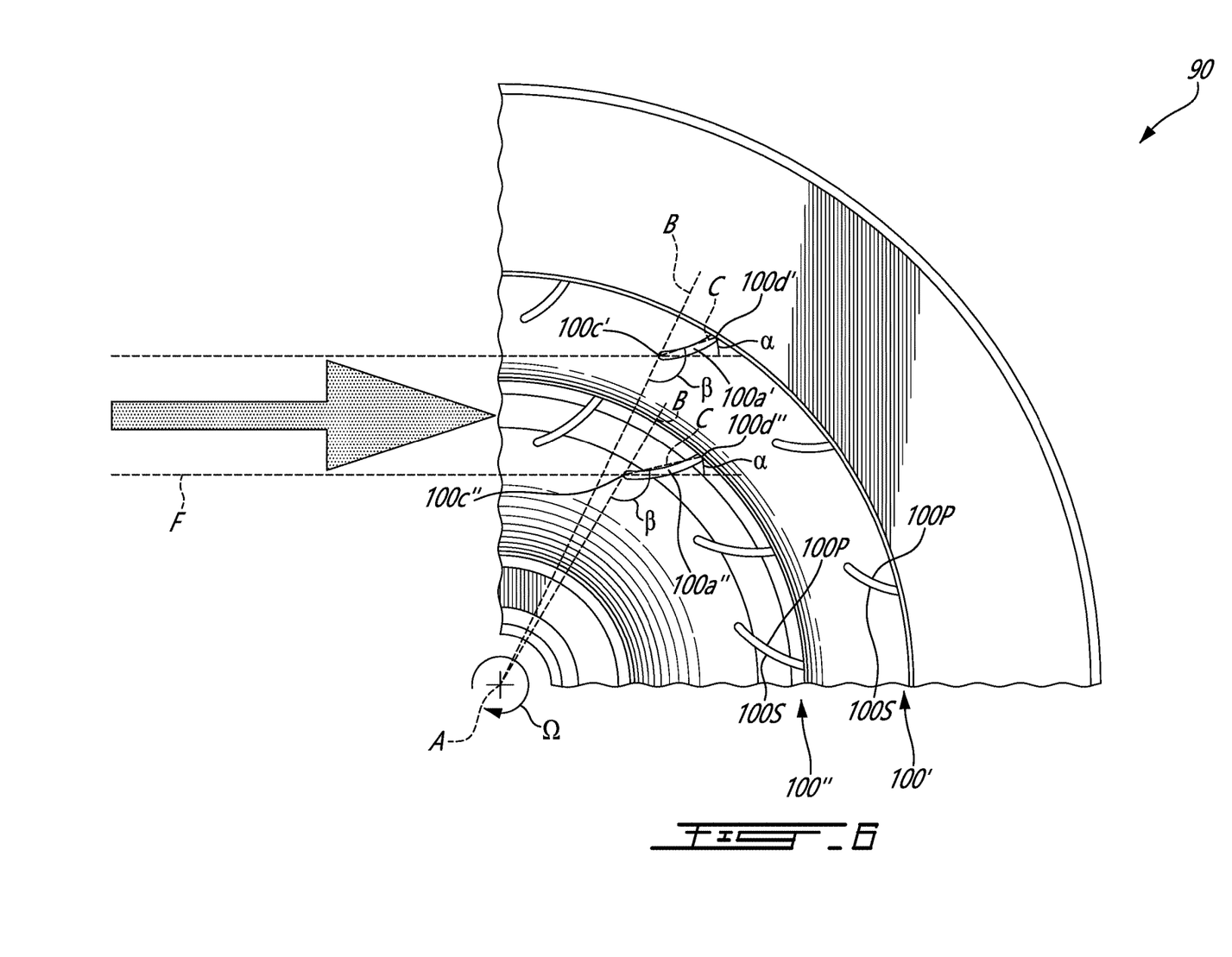
FIG. 6 is a rear side view of the deaeration rotor of FIG. 4.

Referring to FIGS. 4-6, the rotor 90 will now be described in additional detail. The rotor 90 generally includes a shaft 92, a casing 94 and a flow divider 96 respectively extending circumferentially about the axis A and in this case provided in the form of an internal ring 92, an external ring 94 and a disc 96. The rotor 90 also comprises at least one series of blades 100 that are circumferentially spaced from one another about the axis A. The aforementioned components 92, 94, 96, 100 of the rotor 90 are rigidly connected to one another, for example via suitable linking members L, such that rotation of any one of such components 92, 94, 96, 100 about the axis A brings the others into synchronous rotation. For example, the internal ring 92 and the external ring 94 may be respectively indirectly connected to one another via the disc 96, and/or they may be directly connected to one another. The at least one series of blades 100 may be one of the components 92, 94, 96, 100 via which rotation of the rotor 90 is imparted. The at least one series of blades 100 is arranged downstream of a rotor inlet 90*i* of the rotor 90 and relative to the upstream component 70 so as to deflect the flow F entering the rotor 90 to induce rotation of the rotor 90 about the axis A. The at least one series of blades 100 may extend in either one or both of the rotor passages $P_{r1}$, $P_{r2}$. It should be understood that depending on the embodiment, only a subset of the blades, for example a sole blade of the at least one series of blades 100, may deflect the flow F at any given time. In some embodiments, the blades of the at least one series of blades 100 extend strictly radially relative to the axis A. In such embodiments, the incident direction of the flow F has a circumferential component relative to the axis A, and the direction of this circumferential component determines the rotation direction Ω. In embodiments, the at least one series of blades 100 includes a plurality of series of blades 100, one of more of which may include blades that are arranged relative to the axis A so as to define the rotation direction Ω. For example, a first series of blades 100' and a second series of blades 100" may be provided. In some such embodiments, the first series of blades 100' extends at least partially inside the first rotor passage $P_{r1}$, whereas the second series of blades 100" extends at least partially inside the second rotor passage $P_{r2}$. The first series of blades 100' may be located radially outward of the second series of blades 100" relative to the axis A. Referring to FIGS. 4 and 6, the at least one series of blades 100, in this case the first and the second series 100', 100" of blades, includes blades that respectively have a root 100*a'*, 100*a"* and a tip 100*b'*, 100*b"* spaced from one another, a leading edge 100*c'*, 100*c"* and a trailing edge 100*d'*, 100*c*1" upstream of the leading edge 100*c'*, 100*c"*. Depending on the embodiment, with regard to the blades of the first series of blades 100', at least part of the root 100*a'* may be attached to the casing 94, and/or at least part of the tip 100*b'* may be attached to the flow divider 96. With regard to the blades of the second series of blades 100", at least part of the root 100*a"* may be attached to the flow divider 96, and/or at least part of the tip 100*b"* may be attached to the shaft 92.

In the depicted embodiment, both series 100', 100" of blades define the rotation direction Ω. Characteristics of the blades defining the rotation direction Ω may differ depending on the embodiment. Each of their blades may have distinctly recognizable pressure 100P and suction 100S surfaces, or sides. The pressure surface 100P may define an acute angle α with respect to a notional axis B extending radially relative to the axis A and intercepting a corresponding blade at its leading edge 100*c'*, 100*c"*. Conversely, the suction surface 100S may define an obtuse angle β with respect to the axis B. In some embodiments, the blades are be curved, in which case a chord C of the blades defines the angles α, β, the pressure surface 100P is concave, and the suction surface 100S is convex. In some such embodiments, as schematically shown in FIG. 6, the pressure surface 100P may be shaped based on a direction of the incident flow F as governed by the upstream component 70. For example, the rotor 90 may be rotationally positionable about the axis A such that the pressure surface 100P of at least one blade 100 of at least one of the series of blades 100', 100" may be said to gradually approach the incident flow F tangentially as it extends toward its corresponding leading edge 100*c'*, 100*c"*, and to gradually impinge on the incident flow F as it extends toward its corresponding trailing edge 100*d'*, 100*d"*.

Referring to FIG. 5, the casing 94 surrounds the shaft 92 and the flow divider 96. The casing 94 and the flow divider define radially therebetween the first rotor passage $P_{r1}$ downstream of the rotor inlet 90*i*. The flow divider 96 and the shaft 92 define radially therebetween the second rotor passage Pre downstream of the rotor inlet 90*i*.

The shaft 92, or internal ring 92, is rotatably supported about the axis A by suitable means (not shown). The shaft 92 extends axially relative to the axis A between a first axial shaft side 92*a* (also referred to as a first axial end or surface) and a second axial shaft side 92*b* (also referred to as a second axial end or surface) facing away from one another. Radially, the shaft 92 extends away from the axis A to a radially outer shaft surface 92*d*. In this embodiment, the shaft 92 is hollow, and therefore ring-like in shape. Indeed, the shaft 92 has a radially inner shaft surface 92*c* that circumscribes an axial passage Pa extending axially through the shaft 92 from the first axial shaft side 92*a* to the second axial shaft side 92*b*. It is contemplated that in some embodiments, the radially inner shaft surface 92*c* and the axial passage Pa may be omitted. At the first axial shaft side 92*a*, the radially outer shaft surface 92*d* defines an inner boundary of the rotor inlet 90*i* into which the upstream component 70 routes the flow F such that it enters the rotor 90. In this case, the rotor inlet 90*i* is fluidly connected to the supply outlet 74 of the upstream component 70.

The casing 94, or external ring 94, extends axially relative to the axis A between a first axial casing side 94*a* (also referred to as a first axial end or surface) and a second axial casing side 94*b* (also referred to as a second axial end or surface) spaced axially and facing away from one another. Radially, the casing 94 extends outwardly relative to the axis A from a radially inner casing surface 94*c* to a radially outer casing surface 94*d*. The radially inner casing surface 94*c* extends lengthwise from the first axial casing side 94*a* to the second axial casing side 94*b*. At the first axial casing side 94*a*, the radially inner casing surface 94*c* defines an outer boundary of the rotor inlet 90*i*. At the second axial casing side 94*b*, the radially inner casing surface 94 defines a first rotor outlet 90*o'* of the rotor 90 from which some of the flow F, i.e., the oil flow, exits the rotor 90 to be routed into a suitable conduit of the downstream component 80. In this case, the first rotor outlet 90*o'* is in fluid communication with the first downstream passage $P_{d1}$.

Still referring to FIG. 5, as it extends away from the rotor inlet 90*i* and toward the first rotor outlet 90*o'*, the radially inner casing surface 94*c* follows a path suitable to interact with the flow F in a manner that promotes separation of the air-oil mixture and/or evacuation of the oil flow. For example, at least a portion 94*c'"* of the radially inner casing surface 94*c*, which may be referred to as a deaerating portion 94*c'"*, defines an outer boundary of the first rotor passage $P_{r1}$. The deaerating portion 94*c'"* may exhibit a radially outwardly concave shape. Indeed, at least part of the deaerating portion 94*c'"* defines a pocket P1, or oil chamber, into which oil may pool as it migrates radially outwardly relative to the axis A as the rotor 90 rotates. In this case, the pocket P1 is a first pocket P1 of a plurality of pockets of the rotor 90. It should be noted that an annular portion of the pocket P1 circumscribes the first series of blades 100'. Stated otherwise, the first series of blades 100' is located immediately inward of an annular portion $P_{r1}'$ of the first passage $P_{r1}$, in this case defined by an annular portion of the first pocket P1. The first series of blades 100' extends radially outwardly in the first passage $P_{r1}$ to radially between the rotor inlet 90i and the outer disc diameter 96d'. The annular portion $P_{r1}'$ of the first passage $P_{r1}$ extends circumferentially about the axis A unobstructed. For instance, all of the blades 100', 100" are located radially inward of the annular portion $P_{r1}'$. In this case, none of the links L are located inside the annular portion $P_{r1}'$. By this arrangement of the casing 94 and the first series of blades 100', oil can travel along the pressure surface(s) of the blade(s) 100' and then pool (i.e., settle, or become more concentrated) in the first pocket P1 radially outward of the blade(s) 100'. The rotor 90 can thus be said to condition the flow F such that the density of the fluid inside the first pocket P1 is greater than that of the flow F upstream of the rotor 90, whereas the density of the fluid in contact with the blade(s) 100' is less than that of the fluid inside of the first pocket P1. This tends to minimize occurrence of churning losses, which may otherwise be greater should the blades 100' extend across the first rotor passage $P_{r1}$ all the way to the radially inner casing surface 94c.

In embodiments, the radially inner casing surface 94c may have an upstream portion 94c', in this case cylindrical in shape, that extends from the rotor inlet 90i to the deaerating portion 94c". The radially inner casing surface 94c may have a downstream portion 94c''' that extends from the deaerating portion 94c" to the first rotor inlet 90o'. The upstream portion 94c' and the downstream portion 94c''', when present, may exhibit one or more cylindrical shapes extending circumferentially relative to the axis A. For example, the downstream portion 94c''' in this case includes a first cylindrical surface proximate to the deaerating portion 94c", a second cylindrical surface proximate to the first rotor outlet 90i', the second cylindrical surface being diametrically wider than the first cylindrical surface, and an axial surface, or seat, extending radially outwardly from the first cylindrical surface to the second cylindrical surface. The downstream portion 94c''' may be shaped for sealingly receiving a complementary portion of the downstream component 80, providing an interface between the rotor 90 and the downstream component 80 that is suitable for limiting oil flow leakage, if any. Other shape configurations of the radially inner casing surface 94c are possible. In embodiments, the deaerating portion 94c" (or the first rotor passage $P_{r1}$ in its entirety, as the case may be) extends from the rotor inlet 90i and/or to the first rotor outlet 90i'. The radially outer casing surface 94d extends from the first axial casing side 94a to the second axial casing side 94b. The radially outer casing surface 94d is in this case cylindrical in shape, although other shapes are contemplated.

Still referring to FIG. 5, the flow divider 96, or disc 96, will now be described in further detail. It should be noted that the flow divider 96 is referred to as such as it provides the rotor 90 with a partition that divides the flow F into the oil flow and the air flow, routing such flows respectively into the first rotor passage $P_{r1}$ and into the second rotor passage $P_{r2}$. The flow divider 96 has a body 96' that extends axially relative to the axis A between a first axial disc side 96a (also referred to as a first axial end or surface) and a second axial disc side 96b (also referred to as a second axial end or surface) spaced axially and facing away from one another. The first axial disc side 96a and the second axial disc side 96b may also be respectively referred to as an upstream side and a downstream side of the body 96', as they respectively generally face toward the upstream component 70 and the downstream component 80 of the deaerator 60. The first axial disc side 96a defines an axial boundary of the second rotor passage $P_{r2}$, whereas the second axial disc side 96a defines an axial boundary of the first rotor passage $P_{r1}$. Radially, the flow divider 96 extends outwardly relative to the axis A from a radially inner disc surface 96c to a radially outer disc surface 96d. The radially inner disc surface 96c extends from the first axial disc side 96a to the second axial disc side 96b, rendering the flow divider 96 hollow about the axis A. The radially inner disc surface 96c may be said to define an outer boundary of the second rotor passage $P_{r2}$. At the second axial disc side 96b, the radially inner disc surface 96c defines a second rotor outlet 90o" of the rotor 90 from which some of the flow F, i.e., the air flow, exits the rotor 90 to be routed into a suitable conduit of the downstream component 80. In this case, the second rotor outlet 90o" is in fluid communication with the second downstream passage $P_{d2}$. The radially outer disc surface 96d defines an outer disc diameter 96d', which in this case is located where the radially outer disc surface 96d meets the second axial disc surface 96b. The annular portion $P_{r1}'$ of the first passage $P_{r1}$ may extend from upstream of the outer disc diameter 96d' to downstream of the outer disc diameter 96d'. The annular portion $P_{r1}'$ extend may extend from radially inward of the outer disc diameter 96d' upstream thereof to radially inward of the outer disc diameter 96d' downstream thereof.

In embodiments, the flow divider 96 includes a lip 98 that extends from the upstream side, or first axial disc side 96a, of the body 96' and generally toward the rotor inlet 90i. The lip 98 has an inner lip surface 98a that defines an outer boundary of the second rotor passage $P_{r2}$, and an outer lip surface 98b that defines an inner boundary of the first rotor passage $P_{r1}$. The outer disc surface 96d may be said to include an outer body surface of the body 96' defining the outer disc diameter 96d' and the outer lip surface 98b. By way of the lip 98, the flow divider 96 divides the flow F at an axial location of the rotor 90 that is closer to the rotor inlet 90i than the body 96'. The lip 98 may also be said to divide the flow F upstream of the body 96', in particular upstream of the outer disc diameter 96d'. In this embodiment, the lip 98 is located radially inward of the outer disc diameter 98d'. The inner lip surface 98a and the outer lip surface 98b extend from the body 96' to a tip 98c of the lip 98. The tip 98c may be said to define an upstream boundary shared by the first rotor passage $P_{r1}$ and the second rotor passage $P_{r2}$, i.e., a location at which the flow F is split into the oil flow and the air flow. At least one of the series of blades 100', 100" may extend from the lip 98. For instance, in the depicted embodiment, the first series of blades 100' extends from the outer lip surface 98b in the first rotor passage $P_{r1}$. A portion of the outer lip surface 98b defines the annular portion $P_{r1}'$ of the first passage $P_{r1}$. In the depicted embodiment, the second series of blades 100" extends from the inner lip surface 98a in the second rotor passage $P_{r2}$. The first series of blades 100' and/or the second series of blades 100" may be located closer to the tip 98c than to the body. In embodiments, the lip 98 is omitted. In such embodiments, the outer body surface defines the upstream boundary.

Still referring to FIG. 5, it should be noted that the body 96' is axially spaced from the second axial shaft side 92b, defining the second rotor passage $P_{r2}$ therebetween. The lip 98 extends from the body 96' so as to axially overhang a portion of the shaft 92. As it extends away from the rotor inlet 90i and toward the second rotor outlet 90o", the inner lip surface 98a follows a path suitable to interact with the flow F in a manner that promotes separation of the air-oil mixture and/or evacuation of the oil flow. For example, at least a portion 98a' of the inner lip surface 98a, which may be referred to as a deaerating portion 98a', defines an outer boundary of the second rotor passage $P_{r2}$. The deaerating portion 98a' may exhibit a radially outwardly concave shape. Indeed, at least part of the deaerating portion 98a' defines a pocket P2, or oil chamber, into which oil may pool as it migrates radially outwardly relative to the axis A as the rotor 90 rotates. In this case, the pocket P2 is a second pocket P2 of the plurality of pockets of the rotor 90. An annular portion of the pocket P2 circumscribes the second series of blades 100". Stated otherwise, the second series of blades 100" is located immediately inward of an annular portion $P_{r2}'$ of the second passage $P_{r2}$, in this case corresponding to an annular portion of the second pocket P2. The annular portion $P_{r2}'$ of the second passage $P_{r2}$ extends circumferentially about the axis A unobstructed. For instance, all of the blades 100', 100" are located radially inward of the annular portion $P_{r2}'$. In this case, none of the links L are located inside the annular portion $P_{r2}'$. By this arrangement of the casing 94 and the second series of blades 100", oil can travel along the pressure surface(s) of the blade(s) 100" to pool (i.e., settle, or become more concentrated) in the second pocket P2 radially outward of the blade(s) 100". The rotor 90 can thus be said to condition the flow F such that the density of the fluid inside the second pocket P2 is greater than that of the flow F upstream of the rotor 90, whereas the density of the fluid in contact with the blade(s) 100" is less than that of the fluid inside of the second pocket P2. This tends to minimize occurrence of churning losses, which may otherwise be greater should the blades 100" extend across the second rotor passage $P_{r2}$ all the way to the inner lip surface 98a.

In some embodiments, the radially outer shaft surface 92d is shaped so as to define a ramp 92e as it extends toward the second axial shaft side 92b. The lip 98 may axially overhang at least a portion of the ramp 92e. For instance, a tip of the ramp 92e located proximate to the second axial shaft side 92b may be located between the body 96' and the tip 98c of the lip 98, and the ramp 92e may be arranged so as to deflect at least some of the flow F toward the second series of blades 100" and/or toward the second pocket P2.

In some embodiments, the lip 98 defines at least one opening O that extends therethrough from the inner lip surface 98a to the outer lip surface 98b in fluid communication between the first and second passages $P_{r1}$, $P_{r2}$. The at least one opening O may be said to fluidly connect the first pocket P1 and the second pocket P2. Hence, at least some of the oil having pooled in the second pocket P2 may migrate therefrom into the first pocket P1 as the rotor 90 rotates. In some embodiments, the first pocket P1 and the second pocket P2 axially overlap one another. For instance, at least a portion of the first pocket P1 may surround the second pocket P2. The opening(s) O may fluidly connect overlapping portions of the first pocket P1 and the second pocket P2.

Multiple configurations of the opening(s) O are contemplated, as shape, orientation and quantity may vary depending on the embodiment. In the present embodiment, the lip 98 defines a series of openings O that are spaced circumferentially from one another relative to the axis A. One or more of the openings O may be disposed circumferentially between consecutive ones of the first and or second series of blades 100', 100". Multiple series of openings O spaced axially from one another may be provided. The openings O extend from the inner lip surface 98a at a location radially outward of the second series of blades 100", to the outer lip surface 98 at a location radially inward of the trailing edges 100d' of the first series of blades 100'.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, multiple series of blades spaced axially from one another may extend in either one or both of the first rotor passage $P_{r1}$ and the second rotor passage Pre. Yet further modifications could be implemented by a person of ordinary skill in the art in view of the present disclosure, which modifications would be within the scope of the present technology.

The invention claimed is:

1. A deaeration rotor for an aircraft engine lubrication system, the deaeration rotor comprising:
    an internal ring extending about an axis, the internal ring having a radially outer internal ring surface defining an inner boundary of an inner passage of the deaeration rotor;
    an external ring extending about the axis, the external ring having a radially inner external ring surface defining an outer boundary of an outer passage of the deaeration rotor;
    a disc extending about the axis radially between the internal ring and the external ring, the disc having a radially inner disc surface defining an outer boundary of the inner passage and a radially outer disc surface defining an inner boundary of the outer passage; and
    a series of blades circumferentially spaced from one another relative to the axis, the series of blades extending in the outer passage from at least one of the external ring and the disc, the series of blades located radially inward of an annular portion of the outer passage immediately downstream of the series of blades.

2. The deaeration rotor of claim 1, wherein the annular portion of the outer passage extends circumferentially about the axis unobstructed.

3. The deaeration rotor of claim 1, wherein the radially outer disc surface has an outer disc diameter, and the annular portion of the outer passage extends from upstream of the outer disc diameter to downstream of the outer disc diameter relative to a lubricant flow through the deaeration rotor.

4. The deaeration rotor of claim 3, wherein the annular portion extends from radially inward of the outer disc diameter upstream thereof to radially inward of the outer disc diameter downstream thereof.

5. The deaeration rotor of claim 1, wherein the disc has a body defining the radially inner disc surface and the radially outer disc surface, and a lip extending from an upstream side of the body, the lip having an inner lip surface bounding a portion of the inner passage and an outer lip surface surrounding the inner lip surface and bounding a portion of the outer passage.

6. The deaeration rotor of claim 5, wherein the radially outer disc surface includes the outer lip surface and an outer body surface of the body having an outer disc diameter, the lip located radially inward of the outer disc diameter relative to the axis.

7. The deaeration rotor of claim 5, wherein the series of blades extends from the outer lip surface in the outer passage.

8. The deaeration rotor of claim 7, wherein the inner lip surface and the outer lip surface extend from the body to a tip of the lip, the series of blades located closer to the tip than to the body.

9. The deaeration rotor of claim 5, wherein the lip defines at least one opening extending from the inner lip surface to the outer lip surface in fluid communication between the inner passage and the outer passage.

10. The deaeration rotor of claim 5, wherein the series of blades is a first series of blades, the deaeration rotor further comprising a second series of blades spaced circumferentially from one another relative to the axis, the second series of blades extending in the inner passage from at least one of the radially outer internal ring surface and the inner lip surface.

11. The deaeration rotor of claim 10, wherein the first series of blades is radially outward of the second series of blades relative to the axis.

12. The deaeration rotor of claim 10, wherein an annular portion of the inner passage is located radially outward of the second series of blades.

13. The deaeration rotor of claim 5, wherein the body is axially spaced from the internal ring, and the lip extends from the body so as to axially overhang a portion of the internal ring.

14. A deaeration system for an engine lubrication system, the deaeration system comprising:
   a deaeration rotor rotatable about an axis and defining a rotor inlet extending circumferentially around the axis, the deaeration rotor including:
      an internal ring extending about the axis;
      a disc extending about the axis, the disc and the internal ring defining radially therebetween an inner passage of the deaeration rotor downstream of the rotor inlet;
      an external ring extending about the axis, the external ring surrounding the internal ring and the disc, the external ring and the disc defining radially therebetween an outer passage of the deaeration rotor downstream of the rotor inlet;
      a series of blades circumferentially spaced from one another relative to the axis, the series of blades extending in the outer passage from at least one of the external ring and the disc, the series of blades located radially inward of an annular portion of the outer passage immediately downstream of the series of blades; and
   a supply conduit having a supply outlet upstream of the rotor inlet and radially inward of the annular portion of the outer passage.

15. The deaeration system of claim 14, wherein the annular portion of the outer passage extends circumferentially about the axis unobstructed.

16. The deaeration system of claim 15, wherein the disc has a body and a lip extending from an upstream side of the body, the lip having an inner lip surface defining an outer boundary of the inner passage and an outer lip surface surrounding the inner lip surface and defining an inner boundary of the annular portion of the outer passage.

17. The deaeration system of claim 16, wherein the body has an outer disc diameter, the lip located radially inward of the outer disc diameter.

18. The deaeration system of claim 17, wherein the annular portion of the outer passage surrounds the outer disc diameter.

19. The deaeration system of claim 17, wherein the series of blades is located radially outward of the internal ring.

20. The deaeration system of claim 17, wherein the series of blades extends radially outwardly in the outer passage to radially between the rotor inlet and the outer disc diameter.

* * * * *